United States Patent
Leano et al.

(10) Patent No.: US 6,453,472 B1
(45) Date of Patent: Sep. 17, 2002

(54) METHOD AND APPARATUS FOR PERFORMING PERIODIC RANGING FOR CABLE MODEMS

(75) Inventors: Chrisanto D. Leano; Guenter E. Roeck, both of San Jose; Mark E. Millet, Milpitas, all of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/324,358

(22) Filed: Jun. 2, 1999

(51) Int. Cl.[7] .................. H04N 7/173; H04B 1/38; H04B 1/00; H04B 7/00; H04L 5/16
(52) U.S. Cl. .................. 725/111; 375/222; 455/69
(58) Field of Search .................. 375/222; 455/3.1, 455/5.1, 69, 14; 340/310; 348/609; 330/149; 370/395; 725/111, 117

(56) References Cited

U.S. PATENT DOCUMENTS

| | | | | |
|---|---|---|---|---|
| 4,512,033 A | * | 4/1985 | Schrock | 455/2 |
| 5,606,725 A | * | 2/1997 | Hart | 455/5.1 |
| 5,710,982 A | * | 1/1998 | Laborde et al. | 455/69 |
| 5,790,533 A | * | 8/1998 | Burke et al. | 370/318 |
| 5,870,134 A | * | 2/1999 | Laubach et al. | 348/12 |
| 5,883,901 A | * | 3/1999 | Chiu et al. | 370/508 |
| 5,943,604 A | * | 8/1999 | Chen et al. | 455/5.1 |
| 5,990,738 A | * | 11/1999 | Wright et al. | 330/149 |
| 6,028,860 A | * | 2/2000 | Laubach et al. | 370/395 |
| 6,035,209 A | * | 3/2000 | Tiedemann, Jr. et al. | 455/522 |
| 6,111,887 A | * | 8/2000 | Daily et al. | 370/449 |

* cited by examiner

Primary Examiner—Andrew Faile
Assistant Examiner—Hai V. Tran
(74) Attorney, Agent, or Firm—Beyer, Weaver & Thomas, LLP

(57) ABSTRACT

Disclosed are a method apparatus for performing periodic ranging with a cable modem. It is determined whether an actual power level of the cable modem requires adjustment to a desired power level and it is indicated to the cable modem that it should adjust the actual power level to an adjusted power level that differs from the actual power level of the cable modem by less than or equal to a first dynamic range associated with the cable modem. In one extension of this method, the first dynamic range represents a difference between a modem dynamic range of the actual power level output by the cable modem and a head end dynamic range for recognizing the actual power level output by the cable modem.

28 Claims, 6 Drawing Sheets

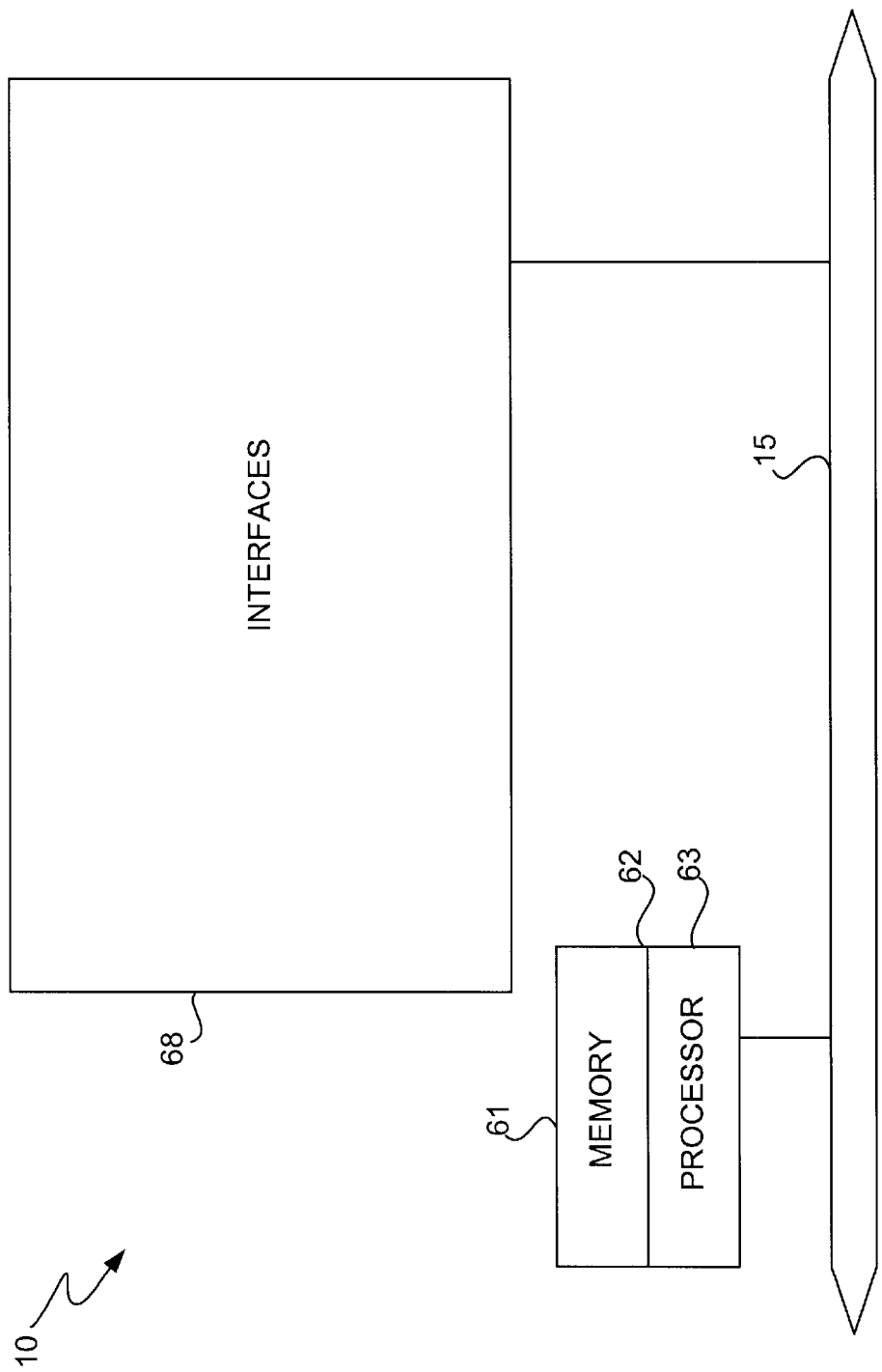

METHOD AND APPARATUS FOR PERFORMING PERIODIC RANGING FOR CABLE MODEMS

BACKGROUND OF THE INVENTION

1. Field of the Invention

The present invention relates to transmitting data over existing cable television plants using cable modems. More specifically, it relates to periodic ranging between the cable modem and the head end.

2. Description of the Related Art

The cable TV industry has been upgrading its signal distribution and transmission infrastructure since the late 1980s. In many cable television markets, the infrastructure and topology of cable systems now include fiber optics as part of its signal transmission component. This has accelerated the pace at which the cable industry has taken advantage of the inherent two-way communication capability of cable systems. The cable industry is now poised to develop reliable and efficient two-way transmission of digital data over its cable lines at speeds orders of magnitude faster than those available through telephone lines, thereby allowing its subscribers to access digital data for uses ranging from Internet access to cablecommuting.

Originally, cable TV lines were exclusively coaxial cable. The system included a cable head end, i.e. a distribution hub, which received analog signals for broadcast from various sources such as satellites, broadcast transmissions, or local TV studios. Coaxial cable from the head end was connected to multiple distribution nodes, each of which could supply many houses or subscribers. From the distribution nodes, trunk lines (linear sections of coaxial cable) extended toward remote sites on the cable network. A typical trunk line is about 10 kilometers. Branching off of these trunk lines were distribution or feeder cables (40% of the system's cable footage) to specific neighborhoods, and drop cables (45% of the system's cable footage) to homes receiving cable television. Amplifiers were provided to maintain signal strength at various locations along the trunk line. For example, broadband amplifiers are required about every 2000 feet depending on the bandwidth of the system. The maximum number of amplifiers that can be placed in a run or cascade is limited by the build-up of noise and distortion. This configuration, known as tree and branch, is still present in older segments of the cable TV market.

With cable television, a TV analog signal received at the head end of a particular cable system is broadcast to all subscribers on that cable system. The subscriber simply needed a television with an appropriate cable receptor to receive the cable television signal. The cable TV signal was broadcast at a radio frequency range of about 60 to 700 MHz. Broadcast signals were sent downstream; that is, from the head end of the cable system across the distribution nodes, over the trunk line, to feeder lines that led to the subscribers. However, the cable system did not have the equipment necessary for sending signals from subscribers to the head end, known as return or upstream signal transmission. Not surprisingly, nor were there provisions for digital signal transmission either downstream or upstream.

In the 1980s, cable companies began installing optical fibers between the head end of the cable system and distribution nodes (discussed in greater detail with respect to FIG. 1). The optical fibers reduced noise, improved speed and bandwidth, and reduced the need for amplification of signals along the cable lines. In many locations, cable companies installed optical fibers for both downstream and upstream signals. The resulting systems are known as hybrid fiber-coaxial (HFC) systems. Upstream signal transmission was made possible through the use of duplex or two-way filters. These filters allow signals of certain frequencies to go in one direction and of other frequencies to go in the opposite direction. This new upstream data transmission capability allowed cable companies to use set-top cable boxes and allowed subscribers pay-per-view functionality, i.e. a service allowing subscribers to send a signal to the cable system indicating that they want to see a certain program.

In addition, cable companies began installing fiber optic lines into the trunk lines of the cable system in the late 1980s. A typical fiber optic trunk line can be up to 80 kilometers, whereas a typical coaxial trunk line is about 10 kilometers, as mentioned above. Prior to the 1990s, cable television systems were not intended to be general-purpose communications mechanisms. Their primary purpose was transmitting a variety of entertainment television signals to subscribers. Thus, they needed to be one-way transmission paths from a central location, known as the head end, to each subscriber's home, delivering essentially the same signals to each subscriber. HFC systems run fiber deep into the cable TV network offering subscribers more neighborhood specific programming by segmenting an existing system into individual serving areas between 500 to 2,000 subscribers. Although networks using exclusively fiber optics would be optimal, presently cable networks equipped with HFC configurations are capable of delivering a variety of high bandwidth, interactive services to homes for significantly lower costs than networks using only fiber optic cables.

FIG. 1 is a block diagram of a two-way hybrid fiber-coaxial (HFC) cable system utilizing a cable modem for data transmission. It shows a head end 102 (essentially a distribution hub) which can typically service about 40,000 subscribers. Head end 102 contains a cable modem termination system (CMTS) 104 connected to a fiber node 108 by pairs of optical fibers 106. The primary functions of the CMTS are (1) receiving signals from external sources 100 and converting the format of those signals, e.g., microwave signals to electrical signals suitable for transmission over the cable system; (2) providing appropriate Media Access Control (MAC) level packet headers (as specified by the MCNS standard discussed below) for data received by the cable system, (3) modulating and demodulating the data to and from the cable system, and (4) converting the electrical signal in the CMTS to an optical signal for transmission over the optical lines to the fiber nodes.

Head end 102 is connected through pairs of fiber optic lines 106 (one line for each direction) to a series of fiber nodes 108. Each head end can support normally up to 80 fiber nodes. Pre-HFC cable systems used coaxial cables and conventional distribution nodes. Since a single coaxial cable was capable of transmitting data in both directions, one coaxial cable ran between the head end and each distribution node. In addition, because cable modems were not used, the head end of pre-HFC cable systems did not contain a CMTS. Returning to FIG. 1, each of the fiber nodes 108 is connected by a coaxial cable 110 to two-way amplifiers or duplex filters 112 which permit certain frequencies to go in one direction and other frequencies to go in the opposite direction. Each fiber node 108 can normally service up to 500 subscribers. Fiber node 108, coaxial cable 110, two-way amplifiers 112, plus distribution amplifiers 114 along trunk line 116, and subscriber taps, i.e. branch lines 118, make up the coaxial distribution system of an HFC system. Subscriber tap 118 is connected to a cable modem 120. Cable modem 120 is, in turn, connected to a subscriber computer 122.

Recently, it has been contemplated that HFC cable systems could be used for two-way transmission of digital data. The data may be Internet data, digital audio, or digital video data, in MPEG format, for example, from one or more external sources 100. Using two-way HFC cable systems for transmitting digital data are attractive for a number of reasons. Most notably, they provide up to a thousand times faster transmission of digital data than is presently possible over telephone lines. However, in order for a two-way cable system to provide digital communications, subscribers must be equipped with cable modems, such as cable modem 120. With respect to Internet data, the public telephone network has been used, for the most part, to access the Internet from remote locations. Through telephone lines, data are typically transmitted at speeds ranging from 2,400 to 33,600 bits per second (bps) using commercial (and widely used) data modems for personal computers. Using a two-way HFC system as shown in FIG. 1 with cable modems, data may be transferred at speeds up to 10 million bps. Table 1 is a comparison of transmission times for transmitting a 500 kilobyte image over the Internet.

TABLE 1

Time to Transmit a Single 500 kbyte Image

| | |
|---|---|
| Telephone Modem (28.8 kbps) | 6–8 minutes |
| ISDN Line (64 kbps) | 1–1.5 minutes |
| Cable Modem (10 Mbps) | 1 second |

Furthermore, subscribers can be fully connected twenty-four hours a day to services without interfering with cable television service or phone service. The cable modem, an improvement of a conventional PC data modem, provides this high speed connectivity and is, therefore, instrumental in transforming the cable system into a full service provider of video, voice and data telecommunications services.

As mentioned above, the cable industry has been upgrading its coaxial cable systems to HFC systems that utilize fiber optics to connect head ends to fiber nodes and, in some instances, to also use them in the trunk lines of the coaxial distribution system. In way of background, optical fiber is constructed from thin strands of glass that carry signals longer distances and faster than either coaxial cable or the twisted pair copper wire used by telephone companies. Fiber optic lines allow signals to be carried much greater distances without the use of amplifiers (item 114 of FIG. 1). Amplifiers decrease a cable system's channel capacity, degrade the signal quality, and are susceptible to high maintenance costs. Thus, distribution systems that use fiber optics need fewer amplifiers to maintain better signal quality.

Digital data on the upstream and downstream channels is carried over radio frequency (RF) carrier signals. Cable modems are devices that convert digital data to a modulated RF signal and convert the RF signal back to digital form. The conversion is done at two points: at the subscriber's home by a cable modem and by a CMTS located at the head end. The CMTS converts the digital data to a modulated RF signal which is carried over the fiber and coaxial lines to the subscriber premises. The cable modem then demodulates the RF signal and feeds the digital data to a computer. On the return path, the operations are reversed. The digital data are fed to the cable modem which converts it to a modulated RF signal (it is helpful to keep in mind that the word "modem" is derived from modulator/demodulator). Once the CMTS receives the RF signal, it demodulates it and transmits the digital data to an external source.

As mentioned above, cable modem technology is in a unique position to meet the demands of users seeking fast access to information services, the Internet and business applications, and can be used by those interested in cable-commuting (a group of workers working from home or remote sites whose numbers will grow as the cable modem infrastructure becomes increasingly prevalent). Not surprisingly, with the growing interest in receiving data over cable network systems, there has been an increased focus on performance, reliability, and improved maintenance of such systems. In sum, cable companies are in the midst of a transition from their traditional core business of entertainment video programming to a position as a full service provider of video, voice and data telecommunication services. Among the elements that have made this transition possible are technologies such as the cable modem.

Before reliable two-way communication is achieved between the head end and the cable modem, a ranging process must be performed between the head end and the cable modem that wishes to communicate with the head end. The ranging process includes an initial ranging process to configure particular parameters of the cable modem for reliable communication. Specifically, the head end tells the cable modem what time slot of what frequency range the cable modem should use. Additionally, the head end specifies particular power adjustments for signals transmitted by the cable modem such that all of the cable modems that are currently communicating with the head end transmit signals to the head end at about the same power levels. Prior to adjustment, individual cable modems will transmit signals that are received by the head end at different power levels because of wide variances between the different signal paths between each cable modem and head end.

After the initial ranging process is complete and the cable modem is configured, the cable modem may begin transmitting data requests to the head end and the head end may begin transmitting data to the cable modem. However, a periodic ranging process is still desired to keep the cable modem configured within acceptable parameters.

Currently, if the head end requires a different desired power level for a particular cable modem, the head end attempts to adjust the cable modem in one step to the new desired power level. That is, the cable modem's power level is adjusted during one cycle of periodic ranging. The head end sends an opportunity for periodic ranging to the cable modem. The cable modem responds with a periodic ranging request. In response to the periodic ranging request, the head end then sends a response indicating that the cable modem must adjust it's power level to the new desired power level.

Although this mechanism for adjusting a cable modem's power level works well in some applications, there is a possibility that the cable modem will have to re-range and re-register with the head end because the cable modem's power level is not heard by the head end. The cable modem's power level may not be heard when the power level of the cable modem remains to be adjusted and there is a relatively large difference between the desired power level and the cable modem's actual power level (e.g., prior to adjusting the cable modem). The head end is expecting the data from the cable modem at the new desired power level and may not see data that is transmitted at power levels that are significantly different than the desired power level. Thus, the head end may not respond to a cable modem that hasn't adjusted to the new desired power level, and, consequently, the cable modem may time out. In sum, a cable modem may disconnect when a large power level adjustment is required.

Therefore, it would be desirable to provide improved mechanisms for facilitating power adjustments to a cable modem, while reducing the number and likelihood of cable modem disconnects.

SUMMARY OF THE INVENTION

Accordingly, the present invention provides an apparatus and method for facilitating periodic ranging by a cable modem. In general terms, if a different desired power level is required for a particular cable modem, the cable modem's power level is gradually adjusted, rather than in one large step. In one implementation, the cable modem's power level is adjusted in steps that are less than or equal to a dynamic range of the power within the cable system.

In one embodiment, a method for performing periodic ranging with a cable modem is disclosed. It is determined whether a power level of the cable modem requires adjustment to a desired power level. If adjustment is required, it is indicated to the cable modem that it should adjust its power level to an adjusted power level that differs from the desired power level such that non recognition of the cable modem is minimized.

In another embodiment, a method implementation includes determining whether an actual power level of the cable modem requires adjustment to a desired power level and indicating to the cable modem that it should adjust the actual power level to an adjusted power level that differs from the actual power level of the cable modem by less than or equal to a first dynamic range associated with the cable modem. In one extension of this method, the first dynamic range represents a difference between a modem dynamic range of the actual power level output by the cable modem and a head end dynamic range for recognizing the actual power level output by the cable modem.

In an apparatus implementation of the invention, a cable modem termination system (CMTS) that is capable of performing periodic ranging with a cable modem is disclosed. The CMTS includes an upstream receiver and demodulator capable of receiving an upstream signal at an input power level from the cable modem and a downstream transmitter and modulator capable of transmitting a downstream signal to the cable modem. The CMTS further includes a processor arranged to determine whether an actual power level of the cable modem requires adjustment to a desired power level and indicate to the cable modem that it should adjust the actual power level to an adjusted power level that differs from the actual power level of the cable modem by less than or equal to a first dynamic range associated with the cable modem.

In another embodiment, the invention pertains to a computer readable medium containing program instructions for performing periodic ranging with a cable modem. The computer readable medium includes computer readable code for determining whether a power level of the cable modem requires adjustment to a desired power level and computer readable code for indicating to the cable modem that it should adjust its power level to an adjusted power level that differs from the desired power level such that non recognition of the cable modem is minimized if adjustment is required.

In another implementation, the invention pertains to a method for performing periodic ranging with a cable modem associated with an upstream channel. The method includes setting an adjustment flag when the actual power level of the cable modem is to be adjusted to a desired power level that differs from the actual power level and performing normal periodic ranging with the cable modem based on a first value of an adjusted power level. The adjusted power level is adjusted to a second value that equals the first value adjusted by less than or equal to a dynamic range of the actual power level of the cable modem when the adjustment flag is set, the first value of the adjusted power level differs from the desired power level, and all of the cable modems associated with the upstream channel have successfully ranged to the first value of the adjusted power level. Normal periodic ranging is performed with the cable modem based on the second value of the adjusted power level when the adjusted power level is set to the second value.

In another cable modem termination system (CMTS) implementation of the invention, the CMTS includes an upstream receiver and demodulator capable of receiving an upstream signal at an input power level from the cable modem, a downstream transmitter and modulator capable of transmitting a downstream signal to the cable modem, and a processor arranged to set an adjustment flag when the actual power level of the cable modem is to be adjusted to a desired power level that differs from the actual power level, perform normal periodic ranging with the cable modem based on a first value of an adjusted power level, and adjust the adjusted power level to a second value that equals the first value adjusted by less than or equal to a dynamic range of the actual power level of the cable modem when the adjustment flag is set, the first value of the adjusted power level differs from the desired power level, and all of the cable modems associated with the upstream channel have successfully ranged to the first value of the adjusted power level. The processor is also arranged to perform normal periodic ranging with the cable modem based on the second value of the adjusted power level when the adjusted power level is set to the second value.

In another computer readable medium embodiment, a computer readable medium includes computer readable code for setting an adjustment flag when the actual power level of the cable modem is to be adjusted to a desired power level that differs from the actual power level, computer readable code for performing normal periodic ranging with the cable modem based on a first value of an adjusted power level, and computer readable code for adjusting the adjusted power level to a second value that equals the first value adjusted by less than or equal to a dynamic range of the actual power level of the cable modem when the adjustment flag is set, the first value of the adjusted power level differs from the desired power level, and all of the cable modems associated with the upstream channel have successfully ranged to the first value of the adjusted power level. The computer readable medium also includes computer readable code for performing normal periodic ranging with the cable modem based on the second value of the adjusted power level when the adjusted power level is set to the second value.

The ranging mechanisms of the present invention have several associated advantages. For example, adjusting the power levels of one or more cable modems in incremental steps minimizes the likelihood that the head end will not recognize input from cable modems that have not yet adjusted to the new power level. In other words, cable modem disconnects may be significantly reduced. Additionally, by implementing variable polling intervals for sending opportunities for periodic ranging, the time for incrementally adjusting the power level to a desired power level may be about the same time as for adjusting the power level in one large step.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 7 is a diagrammatic representation of a router.

DETAILED DESCRIPTION OF SPECIFIC EMBODIMENTS

Reference will now be made in detail to specific embodiments of the invention. Examples of these embodiments are illustrated in the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 2:
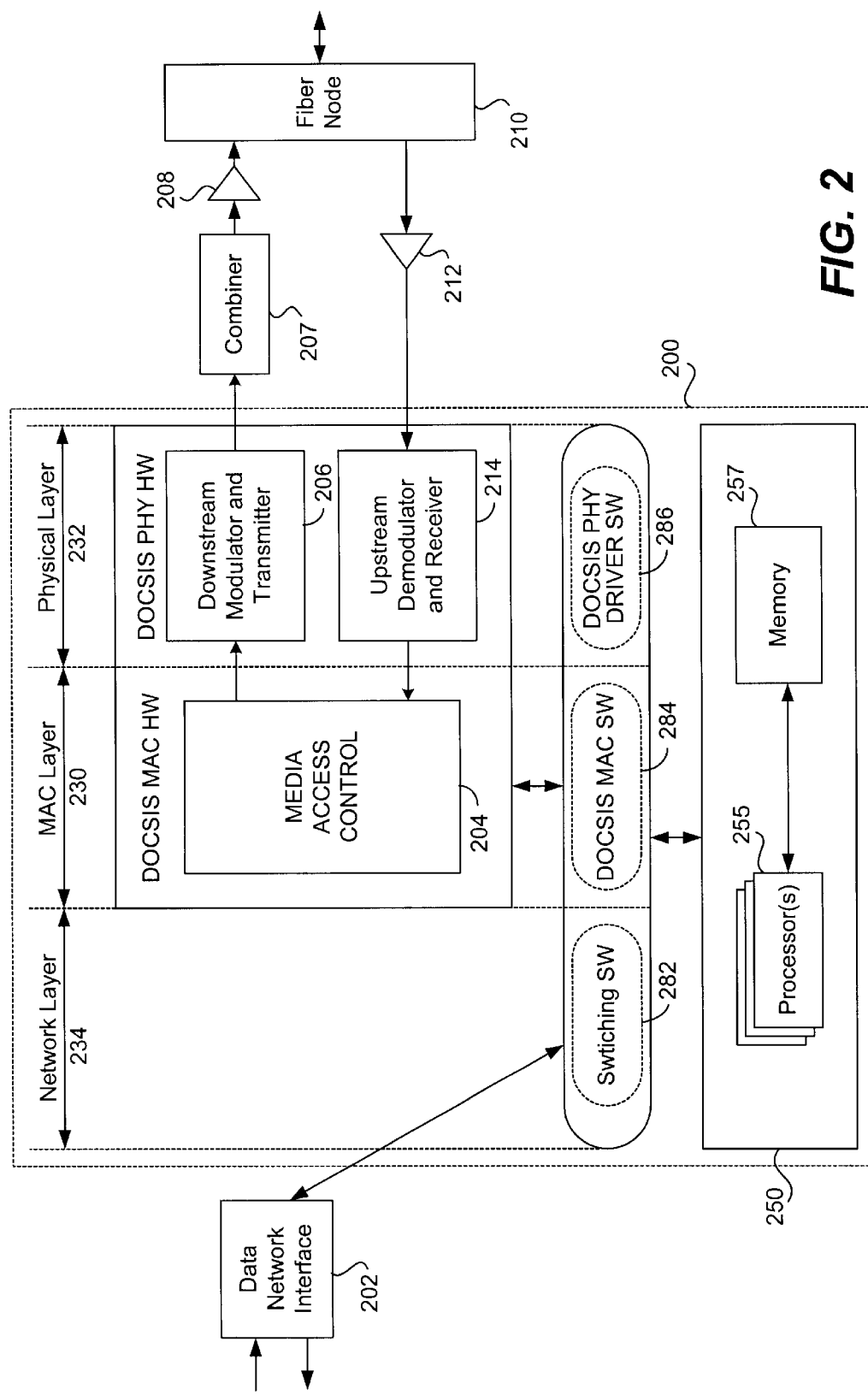
FIG. 2 is a diagrammatic representation illustrating the basic components of a Cable Modem Termination System (CMTS).

FIG. 2 is a diagrammatic representation illustrating the basic components of a Cable Modem Termination System (CMTS), represented by block 200. In a specific embodiment as shown, for example, in FIG. 2, the CMTS implements three network layers, including a physical layer 232, a Medial Access Control (MAC) layer 230, and a network layer 234. When a modem sends a packet of information (e.g. data packet, voice packet, etc.) to the CMTS, the packet is received at fiber node 210. Each fiber node 210 can generally service about 500subscribers, depending on bandwidth. Converter 212 converts optical signals transmitted by fiber node 210 into electrical signals that can be processed by upstream demodulator and receiver 214. The upstream demodulator and receiver 214 is part of the CMTS physical layer 232. Generally, the physical layer is responsible for receiving and transmitting RF signals n the HFC cable plant. Hardware portions of the physical layer include downstream modulator and transmitter 206 and upstream demodulator and receiver 214. The physical layer also includes device driver software 286 for driving the hardware components of the physical layer.

Once an information packet is demodulated by the demodulator/receiver 214, it is then passed to MAC layer 230. A primary purpose of MAC layer 230 is to coordinate channel access of multiple cable modems sharing the same cable channel. The MAC layer 230 is also responsible for encapsulating and de-encapsulating packets within a MAC header according to the DOCSIS standard for transmission of data or other information. This standard is currently a draft recommendation, which has been publicly presented to Study Group 9 of the ITU in October 1997, and is generally known to people in the cable modem data communication field. The DOCSIS standard is outlined, in part, in "Data-Over-Cable Service Specifications Radio Frequency Interface SP-RFI-104-980724", which is herein incorporated by reference in its entirety.

MAC layer 230 includes a MAC hardware portion 204 and a MAC software portion 284, which function together to encapsulate information packets with the appropriate MAC address of the cable modem(s) on the system. Note that there are MAC addresses in the cable modems which encapsulate data or other information to be sent upstream with a header containing the MAC address of the hub associated with the particular cable modem sending the data.

Each cable modem on the system has its own MAC address. Whenever a new cable modem is installed, its address is registered with MAC layer 230. The MAC address is important for distinguishing data sent from individual cable modems to the CMTS. Since all modems on a particular channel share a common upstream path, the CMTS 204 uses the MAC address to identify and communicate with a particular modem on a selected upstream channel. Thus, data packets, regardless of format, are mapped to a particular MAC address.

MAC layer 230 is also responsible for sending out polling opportunities as part of the link protocol between the CMTS and each of the cable modems on a particular channel. As discussed above, these polling opportunities are important for maintaining communication between the CMTS and the cable modems (e.g., by providing opportunities for periodic ranging).

A cable modem's power level is typically adjusted during periodic ranging, and an adjustment may be initiated in any suitable manner. For example, the head end may automatically track load balancing among cable modems and automatically initiate an alteration to a particular cable modem's power level to facilitate load balancing. Additionally or alternatively, adjustment of a cable modem's power level may be initiated by a command from a user.

Figure 3:
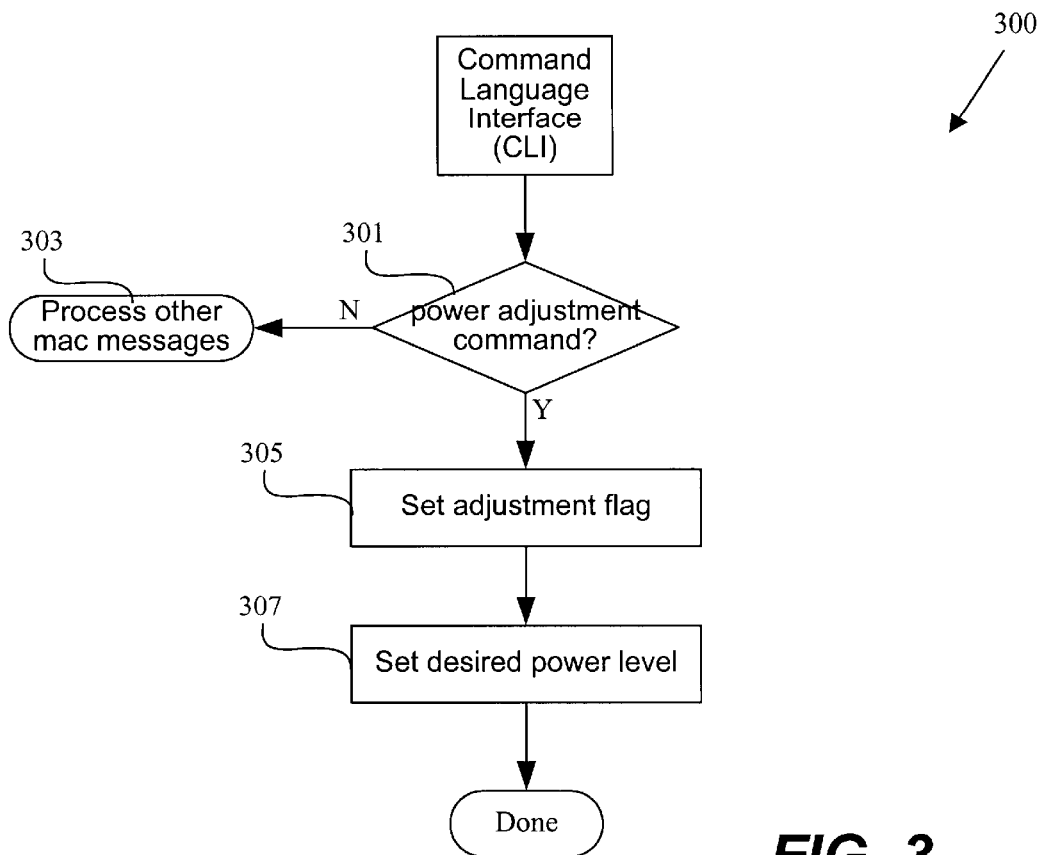
FIG. 3 is a flowchart illustrating the process for handling a user command to adjust a power level of one or more cable modems in accordance with one embodiment of the present invention.

FIG. 3 is a flowchart illustrating the process 300 for handling a user command to adjust a power level of one or more cable modems in accordance with one embodiment of the present invention. Initially, it is determined whether a power adjustment command has been entered in operation 301. A power adjustment command may be in any suitable format and depends on how the particular user interface software is configured. By way of example, the command "cable uX power-level VALUE" is entered via a graphical user interface of the Command Language Interface (CLI) software, which is available from Cisco Technology, Inc. of San Jose, Calif. In one CLI version, the "uX" parameter indicates the upstream channel number that is associated with the cable modems that are to be adjusted, and the "VALUE" parameter indicates the desired power level. The "X" of the uX parameter may be set to an integer value between 0 to 5, and the "VALUE" parameter may be set to a value between −10 dBMv to +25 dBMv.

If a power adjustment command has not been entered (i.e., another type of command has been entered), the other command is processed in operation 303. If there is a power adjustment command, an adjustment flag associated with the selected upstream channel number is then set in operation 305. A desired power level variable associated with the selected upstream channel number is also set to the entered power level in operation 307. The adjustment flag is later used by the ranging process to determine whether the cable modems associated with the selected upstream channel number require an adjustment to their power levels, and the desired power level variable is then used as the end goal for the power levels of the cable modems. After these variables are set, the command handling process 300 then ends.

As described above, the ranging process is typically performed within the MAC layer of the head end (e.g., 230 of FIG. 2). The ranging process may be implemented by any suitable combination of hardware and/or software. In one embodiment, ranging is implemented by a routine that is invoked by a MAC message. MAC messages include any suitable commands that are implemented by the MAC layer (e.g., 230 of FIG. 2). For example, a MAC message may be a periodic ranging request, an initial ranging request, a request for registration from a cable modem, or a request for bandwidth from a cable modem.

Figure 4:
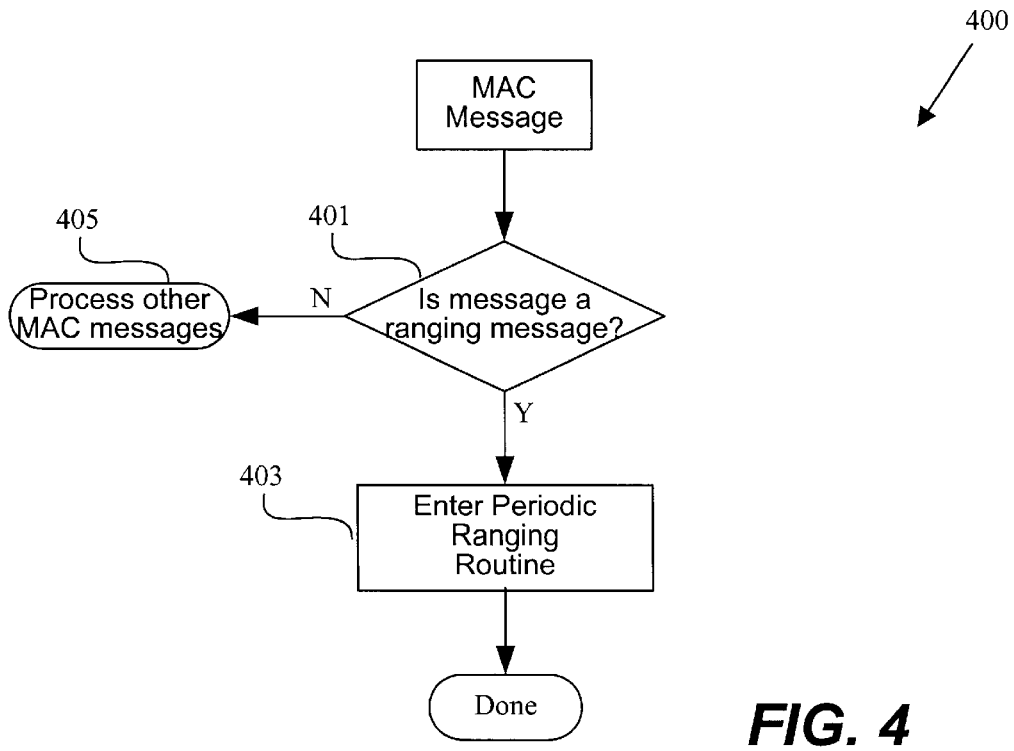
FIG. 4 is a flowchart illustrating a process for handling a MAC message in accordance with one embodiment of the present invention

FIG. 4 is a flowchart illustrating a process 400 for handling a MAC message in accordance with one embodiment of the present invention. Initially, it is determined whether the MAC message is a ranging type MAC message in operation 401. If it is not, other MAC messages are processed in operation 405. If it is a ranging message, a periodic ranging routine is entered in operation 403.

In one implementation of periodic ranging, the head end's hardware is configured to compare the power level input from the cable modem with an adjusted power level. The adjusted power level is the power level at which the cable modems are set or will be set. A difference between the values of the adjusted power level and the cable modem's actual power level results in an adjustment to the cable modem's power level that is equal to this power level difference.

The head end periodically provides an opportunity for periodic ranging to the cable modem. In response to the opportunity, the cable modem sends a request for periodic ranging back to the head end. The head end then sends a response to the particular cable modem's ranging request indicating that the cable modem must adjust its power level to the adjusted power level. The cable modem then adjusts its power level output accordingly.

The adjusted power level may be altered to change the power levels of one or more cable modems. In one embodiment, each upstream channel has an associated adjusted power level for changing the power levels of the cable modems that are associated with each upstream channel. For example, a first group of cable modems that are associated with a first upstream channel are set to a first power level that is indicated by a first adjusted power level; a second group of cable modems that are associated with a second upstream channel are set to a second power level that is indicated by a second adjusted power level; etc. Of course, each group of cable modems may be set to a same power level or different power levels.

The adjusted power level is based on the desired power level (e.g., the desired power level input through the command language interface). The adjusted power level may be adjusted by any suitable value such that the likelihood of cable modems not being heard by the head end is minimized. Preferably, the adjusted power level is increased or decreased by an amount equal to or less than the dynamic range of the power within the cable system. The dynamic range may include the dynamic range of the head end for distinguishing between power levels of a received upstream signal and/or the dynamic range of the cable modem for outputting an upstream signal. Example dynamic range values are described further below with reference to FIG. 5. That is, the adjusted power level may be initially set to a value that is less than the desired power level. If the dynamic range is less than the desired power level, the adjusted power level value is incrementally increased (or decreased) in steps that are less than or equal to the dynamic range until the adjusted power level reaches the desired power level. In other words, the cable modems gradually adjust their power levels in small incremental steps.

Figure 5:
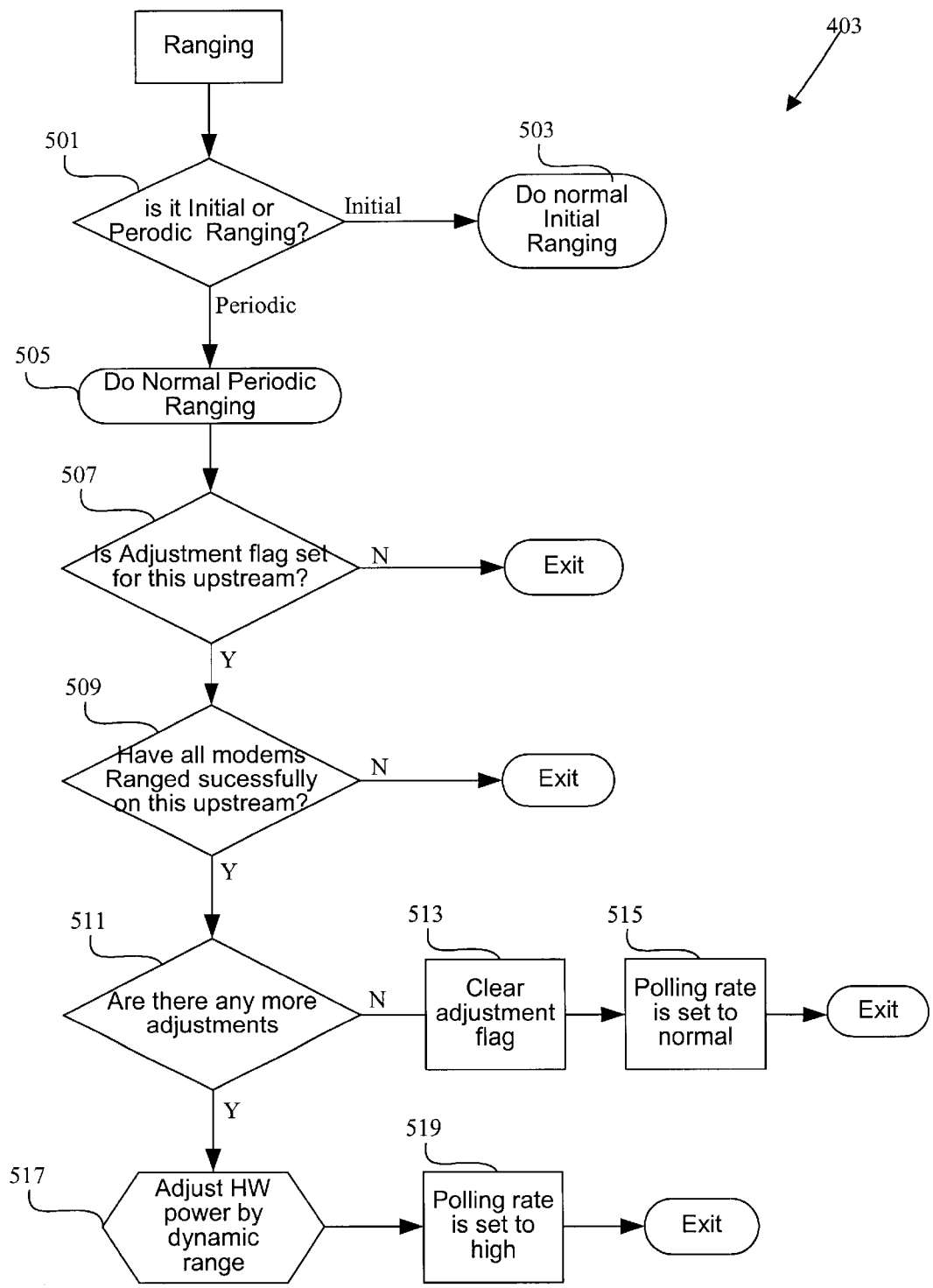
FIG. 5 is a flowchart illustrating the ranging routine of FIG. 4 in accordance with one embodiment of the present invention.

FIG. 5 is a flowchart illustrating the ranging routine 403 of FIG. 4 for a cable modem in accordance with one embodiment of the present invention. Although FIG. 5 merely illustrates the ranging processes for a single cable modem, it should be understood that such a ranging process may be repeated for one or more cable modems that are associated with a particular upstream channel, for example. Of course, the ranging process may include mechanisms for ranging all or some of the modems.

In the illustrated embodiment, if a new desired power level is desired for the modems of a particular upstream channel, a periodic ranging process is periodically performed between each cable modem and the head end (e.g., ranging routine 403 is repeated). During each periodic ranging process, a cable modem's power level is adjusted by a dynamic range value. The periodic ranging process is repeated for each modem so that all of the modems are adjusted by the dynamic range. The periodic ranging process is repeated again for each modem to again adjust the power level of each modem by the dynamic range value until all of the modems reach the desired power level.

For simplicity, the ranging process for a single modem of a particular upstream channel is described with reference to FIG. 5. Operations 501, 503, and 505 represent normal ranging routines including initial and periodic ranging. Normal ranging is understood by those skilled in the field of cable modem systems. The present invention for gradually increasing or decreasing the power level of one or more cable modems may be implemented prior to or after these normal ranging routines, or may be integrated with the normal ranging routines themselves (i.e., by altering the normal ranging routines). In the illustrated embodiment of FIG. 5, mechanisms of present invention are implemented after the normal ranging routines such that the normal routines are left unaltered.

Referring to FIG. 5, it is first determined whether initial ranging or periodic ranging is to be performed in operation 501. In other words, does initial ranging have to be performed for a new cable modem. If it is determined that initial ranging has to be performed, the normal initial ranging process is performed for the new cable modem in operation 503. Initial ranging is performed when a cable modem is first attempts to communicate with the head end. During initial ranging, the new cable modem transmits to the head end at various power levels until the head end recognizes the cable modem. When the cable modem is recognized by the head end, the cable modem has found an acceptable initial power level for communicating with the head end. The ranging process 500 then ends.

If initial ranging is not required, normal periodic ranging is performed in operation 505. During normal periodic ranging, the head end sends an opportunity for periodic ranging to the cable modem. The head end then receives a periodic ranging request from the cable modem. The head then sends a response to the periodic ranging request from the cable modem. The periodic ranging response indicates whether the cable modem is acceptably configured. If the cable modem is not acceptably configured, the response communicates adjustment values for the cable modem's unacceptable parameters. For example, if the power level is to be adjusted from 2 dBMv to 5 dBMv, the head end indicates in its response that the cable modem should adjust its power level by +3 dBMv. The cable modem then adjusts it's parameters accordingly.

The power level of a particular cable modem associated with a particular upstream channel is adjusted when the cable modem's input power level differs from the adjusted power level for that cable modem. Any suitable combination of hardware and software may be implemented to control and/or adjust the cable modem's input power level.

Figure 6:
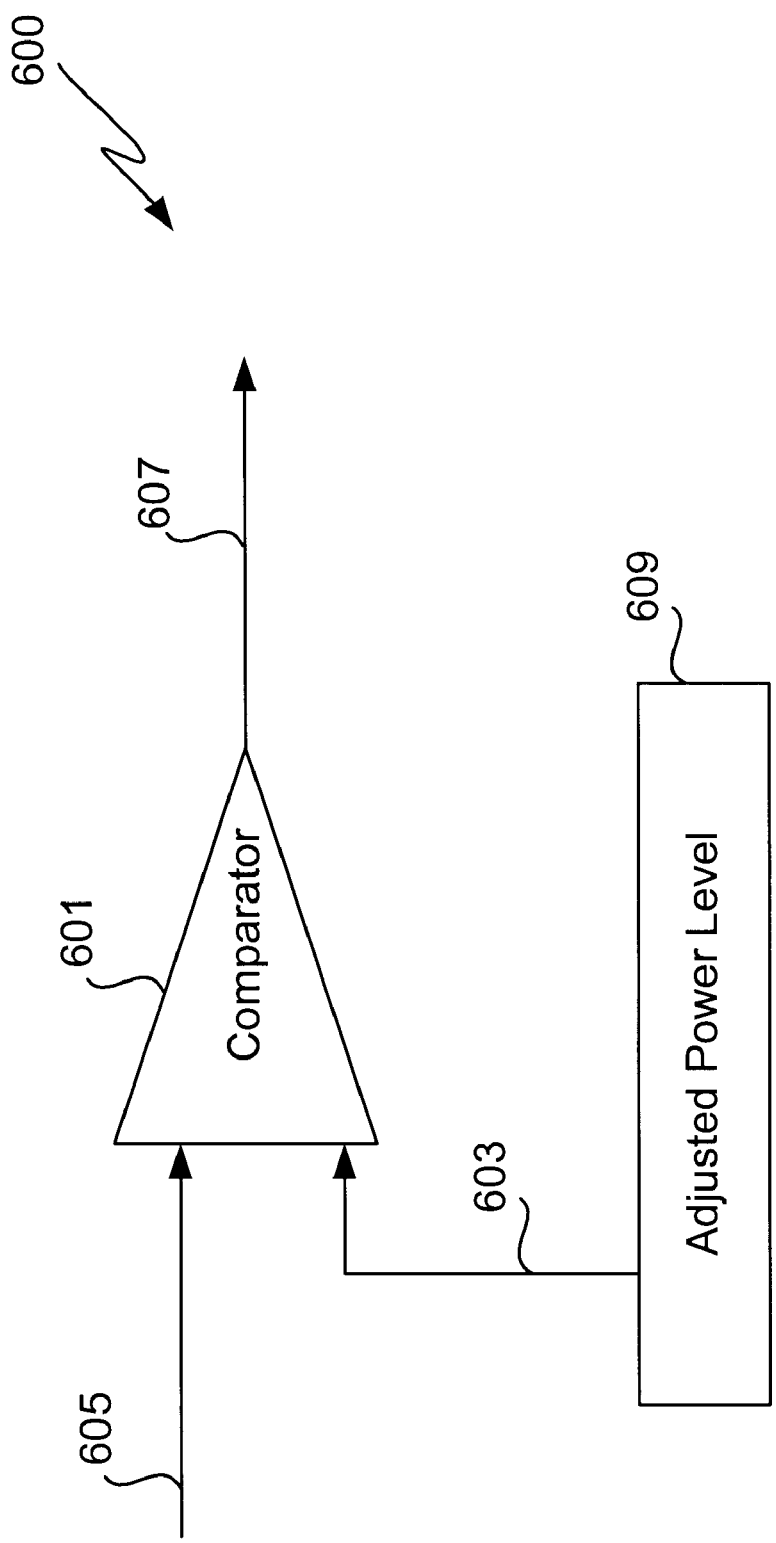
FIG. 6 shows a representation of a power control mechanism for adjusting a cable modem's input power level in accordance with one embodiment of the present invention.

FIG. 6 shows a representation of a power control mechanism 600 for adjusting a cable modem's input power level in accordance with one embodiment of the present invention. As shown, a comparator 601 receives and compares the adjusted power level 603 and an input power level 605 from a particular cable modem. The adjusted power level 603 is obtained from register 609. The comparator 601 then outputs a voltage difference 607 between the adjusted power level 603 and actual power level 605. If the difference 607 is zero, no adjustment is required. If there is a difference 607, this difference is communicated to the cable modem (e.g., within the head end's periodic ranging response). In sum, the cable modem's power level may be altered by writing an adjusted power level value to register 609. However, in the illustrated embodiment, the hardware (e.g., adjusted power level register 609) is not adjusted to initiate a power level change until after normal ranging is performed.

After normal periodic ranging is performed, it is first determined whether the adjustment flag is set for this upstream channel in operation 507. The process 403 illustrated in FIG. 5 represents a ranging process that is repeated for one or more cable modems that are associated with a particular upstream channel. Of course, a single ranging process may be used for all cable modems of all upstream channels. The adjustment flag for this particular upstream channel may be set when an adjustment is desired for the power levels of the cable modems on the particular upstream channel. If the adjustment flag is not set, the ranging process 500 ends for this particular upstream channel. If the adjustment flag is set, it is then determined whether all the modems of this particular upstream channel have ranged successfully in operation 509. In other words, it is determined whether the associated modems have successfully ranged to a previous adjusted power level. If the modems have not ranged successfully, the ranging process 500 ends.

Any suitable mechanisms may be implemented for determining whether the cable modems for this particular upstream channel have successfully ranged. In one implementation, each active cable modem is associated with a ranging success flag that is set when its associated cable modem has successfully ranged and cleared when a new ranging process is initiated. The flags associated with the cable modems of a particular upstream channel may then be checked to determine whether all the cable modems for the particular upstream channel have ranged successfully. If all the associated flags are set, the modems have successfully ranged. If one or more flags are equal to zero, the modems have not successfully ranged.

If the modems have ranged successfully, it is then determined whether any more adjustments are required in operation 511. In other words, it is determined whether the cable modems have been adjusted to the desired power level (e.g., as input by a user through CLI software). If there are no more adjustments required, the adjustment flag is then cleared in operation 513. The polling interval (i.e. the interval between opportunities for periodic ranging) is then set to a normal polling value. For example, the polling interval is set to 25 seconds. Mechanisms for changing the polling interval are further described in commonly assigned, copending U.S. patent application Ser. No. 09/324,366, entitled "METHOD AND APPARATUS FOR ENHANCING PERIODIC RANGING FOR CABLE MODEMS", by Guenter E. Roeck, which is incorporated herein by reference in its entirety for all purposes. After the polling interval is set to a normal value, the ranging process then ends. The ranging process, of course, is invoked again after the polling interval (i.e., 25 seconds) so that periodic ranging may be performed again.

If there are more adjustments required, the hardware's power level may be adjusted by an amount equal to a dynamic range of the cable system in operation 517. In other words, the hardware for adjusting the cable modem is configured to adjust the power level by an amount that is less than or equal to the dynamic range. The hardware may be configured in suitable manner. In the implementation of FIG. 6, the value of the adjusted power level register 609 is increased or decreased by the dynamic range.

The dynamic range used for the adjusted power level may be based on the dynamic range of the power levels output by the cable modem and/or the dynamic range of the head end for recognizing the input power level relative to the adjusted power level. For example, power levels transmitted by the cable modems may have a dynamic range of ±2 dBmv. In this example, if a particular cable modem sets its power level at 2 dBmv, the cable modem's actual power level may be anywhere from 0 dBmv to 4 dBmv. Likewise, if the head end is configured to receive input power levels at 2 dBmv with a dynamic range of ±3 dBmv, the head end will not recognize input power levels above 5 dBmv or below −1 dBmv.

The adjusted power level is increased or decreased by a value that is less than or equal to the difference between the cable modems' and the head end's dynamic range. In the above example, the adjusted power level may be increased or decreased by 1 dBmv at a time. This value will allow cable modems that have been adjusted to the adjusted power level ±2 dBmv, as well as cable modems that are set to the previous power level values ±2 dBmv, to be recognized by the head end. To further illustrate, if the cable modems are set to 0 dBmv and a desired power level of 10 dBmv is required, the cable modems should be increased by 1 dBmv. That is, the adjusted power level is set to 1 dBmv. Those modems that are not yet adjusted have a power level between −2 dBmv and +2 dBmv, and those modems that have been adjusted have a power level between −1 dBmv and +3 dBmv. The head recognizes power levels between −2 dBmv and +4 dBmv. Thus, the head end will recognize both groups of modems.

The polling interval may then be optionally increased in operation 519. For example, the polling interval is set to 100 milliseconds. This shortened polling interval allows a quicker adjustment time to compensate for the additional time for incrementally increasing or decreasing the cable modem's power levels, as opposed to increasing or decreasing in one large step. After the polling interval is set to a higher value, the ranging process then ends. The ranging process, of course, is invoked again after the polling interval (i.e., 100 milliseconds) so that periodic ranging may be performed again.

After ranging is performed, the CMTS may then process data requests from the cable modem. Referring again to FIG. 2, after upstream information (e.g., data requests from the cable modem) has been processed by MAC layer 230, it is then passed to network layer 234. Network layer 234 includes switching software 282 for causing the upstream information packet to be switched to an appropriate data network interface on data network interface 202.

When a packet is received at the data network interface 202 from an external source, the switching software within network layer 234 passes the packet to MAC layer 230. MAC block 204 transmits information via a one-way communication medium to a downstream modulator and transmitter 206. Downstream modulator and transmitter 206 takes the data (or other information) in a packet structure and modulates it on the downstream carrier using, for example, QAM 64 modulation (other methods of modulation can be used such as CDMA {Code Division Multiple Access}, OFDM {Orthogonal Frequency Division Multiplexing}, FSK {FREQ Shift Keying}). The return data are likewise modulated using, for example, QAM 16 or QSPK. These modulations methods are well-known in the art.

Downstream Modulator and Transmitter 206 converts the digital packets to modulated downstream RF frames, such as, for example, MPEG or ATM frames. Data from other services (e.g. television) is added at a combiner 207. Converter 208 converts the modulated RF electrical signals to optical signals that can be received and transmitted by a Fiber Node 210 to the cable modem hub.

It is to be noted that alternate embodiments of the CMTS (not shown) may not include network layer 234. In such embodiments, a CMTS device may include only a physical layer and a MAC layer, which are responsible for modifying a packet according to the appropriate standard for transmission of information over a cable modem network. The network layer 234 of these alternate embodiments of CMTS devices may be included, for example, as part of a conventional router for a packet-switched network.

Figure 1:
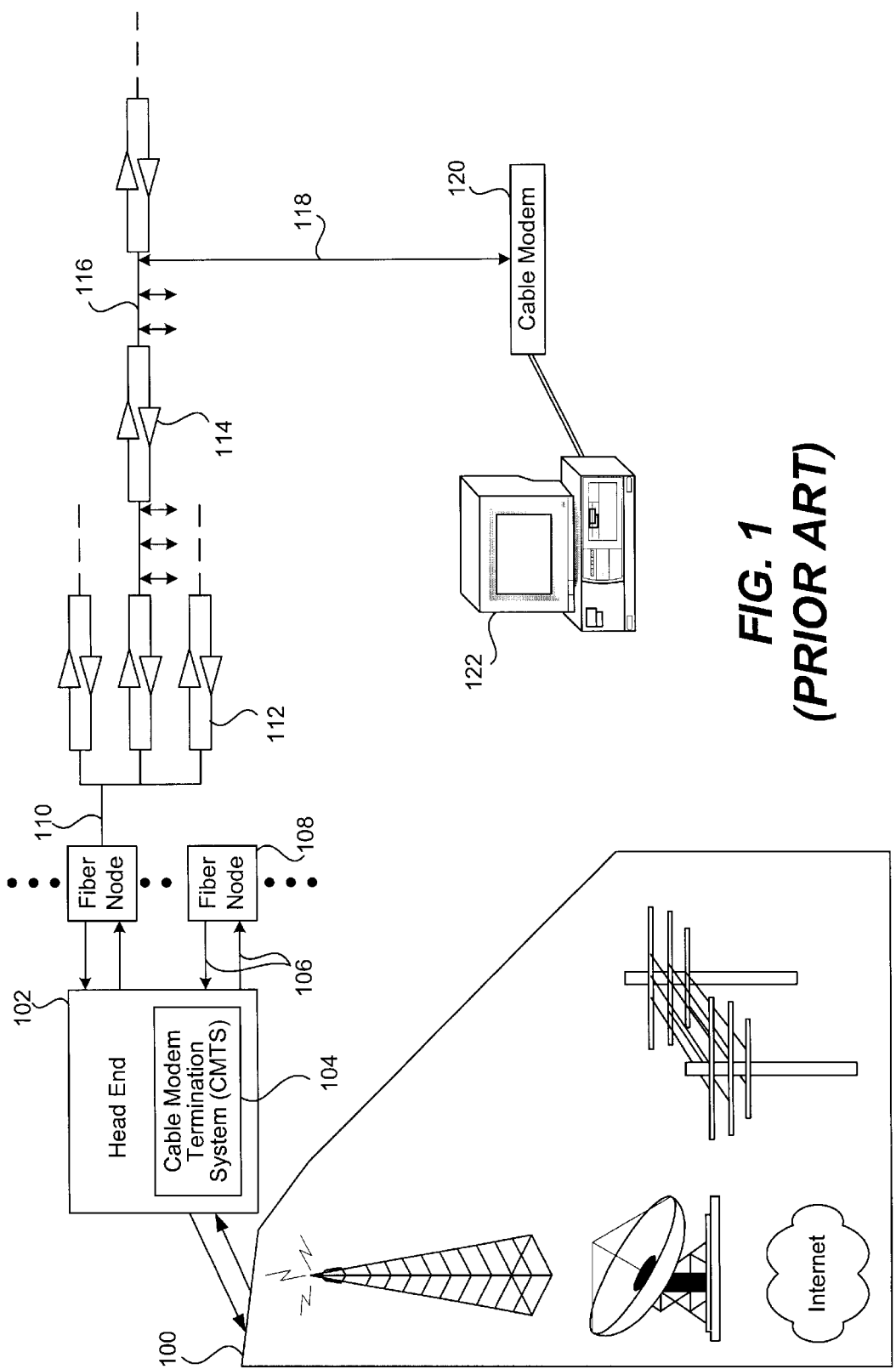
FIG. 1 is a block diagram of a two-way hybrid fiber-coaxial (HFC) cable system utilizing a cable modem for data transmission.

In a specific embodiment, the network layer of the CMTS is configured as a cable line card coupled to a standard router that includes the physical layer 232 and MAC layer 230. Using this type of configuration, the CMTS is able to send and/or eceive IP packets to and from the data network interface 202 using switching software block 282. The data network interface 202 is an interface component between external data sources and the cable system. The external data sources (item 100 of FIG. 1) transmit data to the data network interface 202 via, for example, optical fiber, microwave link, satellite link, or through various media. The data network interface includes hardware and software for interfacing to various networks such as, for example, Ethernet, ATM, frame relay, etc.

As shown in FIG. 2, CMTS 204 also includes a hardware block 250 which interacts with the software and other hardware portions of the various layers within the CMTS. Block 250 includes one or more processors 255 and memory 257. The memory 257 may include, for example, I/O memory (e.g. buffers), program memory, shared memory, etc. Hardware block 250 may physically reside with the other CMTS components, or may reside in a machine or other system external to the CMTS. For example, the hardware block 250 may be configured as part of a router which includes a cable line card.

Generally, the periodic ranging techniques of the present invention may be implemented in software and/or hardware. For example, it can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid ranging system of this invention is preferably implemented on a general-purpose programmable machine selectively activated or reconfigured by a computer program stored in memory. Such a programmable machine may be a network device designed to handle network traffic. Such network devices typically have multiple network interfaces including frame relay and ISDN interfaces, for example. Specific examples of such network devices include routers and switches. For example, the ranging systems of this invention may be specially configured routers (such as, for example, specially configured router models 1600, 2500, 2600, 3600, 4500, 4700, 7200, 7500, and 12000, available from Cisco Systems, Inc. of San Jose, Calif.) which have been adapted to interface with cable networks. A general architecture for some of these machines will appear from the description given below. In an alternative embodiment, the ranging system may be implemented on a general-purpose network host machine such as a personal computer or workstation adapted to interface with computer networks. Further, as described previously, the invention may be at least partially implemented on a card (e.g., a cable line card) for a network device or a general-purpose computing device.

Referring now to FIG. 7, a router 10 suitable for implementing the present invention includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for initiating ranging processes, adjusting the power level of one or more cable modems, for example, by adjusting the hardware of the head to receive signals from the cable modem at a new adjusted power level, and adjusting the polling interval. It preferably accomplishes all these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system.

The interfaces 68 are typically provided as interface cards (sometimes referred to as "line cards"). Generally, they control the sending and receiving of data packets over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 7 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (including memory 61) configured to store program instructions for the general-purpose network operations and mechanisms for adjusting the power level of one or more cable modems described herein. The program instructions may control the operation of an operating system and/or one or more applications, for example. The memory or memories may also be configured to store the adjustment flags for each set of one or more cable modems associated with a particular upstream channel, desired power level variables for the modems of each upstream channel, adjusted power level variables for the modems of each upstream channel, and ranging success flags for each cable modem, as described above.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for dynamically adjusting a power level of a cable modem, the method comprising:

performing initial periodic ranging with a cable modem to determine a dynamic range of power levels of the cable modem that are recognized by a cable termination system (CMTS); and performing periodic ranging with the cable modem to dynamically adjust the cable modem's power level so that it substantially matches a desired power level, wherein the adjustments include incrementally increasing or decreasing the cable modem's power level based on the determined dynamic range of the cable modem.

2. A method as recited in claim 1, further comprising receiving a new desired power level for the cable modem, wherein the periodic ranging is performed to dynamically adjust the cable modem's power level so that it substantially matches the new desired power level, wherein the adjustments include incrementally increasing or decreasing the cable modem's power level based on the determined dynamic range of the cable modem.

3. A method as recited in claim 1, wherein the cable modem's power level is incremented or decremented no more than the determined dynamic range of the cable modem.

4. A method as recited in claim 1, further comprising:

performing initial periodic ranging with a second cable modem to determine a second dynamic range of power levels of the second cable modem that are recognized by the CMTS, wherein the second dynamic range differs from the first dynamic range; and performing periodic ranging with the second cable modem to dynamically adjust the second cable modem's power level so that it substantially matches the desired power level, wherein the adjustments include incrementally increasing or decreasing the second cable modem's power level based on the determined second dynamic range of the second cable modem.

5. A method as recited in claim 4, wherein the second cable modem's power level is incremented or decremented no more than the determined second dynamic range of the second cable modem.

6. A method as recited in claim 1, further comprising determining whether an adjustment flag associated with the cable modem indicates adjustment is to be performed, wherein the periodic ranging is only performed when it is determined that the adjustment flag associated with the cable modem indicates adjustment is to be performed.

7. A method as recited in claim 6, further comprising setting the adjustment flag to indicate adjustment is to be performed when a user specifies the desired power level.

8. A method as recited in claim 1, wherein the periodic ranging is performed on a plurality of cable modems associated with a same upstream channel, the periodic ranging comprising:

ranging the cable modems to a first set of incremental or decremental adjustments to their respective power levels;

tracking whether the cable modems have successfully ranged to the first set of incremental or decremental adjustments to the cable modems' power levels; and ranging the cable modems to a second set of incremental or decremental adjustments to the cable modems' power levels after the cable modems have all successfully ranged to the first adjustment to the cable modems' power level.

9. A method as recited in claim 1, wherein the determined dynamic range represents a difference between a modem dynamic range of the actual power level output by the cable modem and a CMTS dynamic range for the CMTS recognizing the actual power level output by the cable modem.

10. A cable modem termination system (CMTS), the CMTS capable of dynamically adjusting a power level of a cable modem comprising:

an upstream receiver and demodulator capable of receiving an upstream signal at an input power level from the cable modem;

a downstream transmitter and modulator capable of transmitting a downstream signal to the cable modem; and a processor arranged to perform initial periodic ranging with a cable modem to determine a dynamic range of power levels of the cable modem that are recognized by the cable termination system (CMTS) and perform periodic ranging with the cable modem to dynamically adjust the cable modem's power level so that it substantially matches a desired power level, wherein the adjustments include incrementally increasing or decreasing the cable modem's power level based on the determined dynamic range of the cable modem.

11. A CMTS as recited in claim 10, the processor being further arranged to receive a new desired power level for the cable modem, wherein the periodic ranging is performed to dynamically adjust the cable modem's power level so that it substantially matches the new desired power level, wherein the adjustments include incrementally increasing or decreasing the cable modem's power level based on the determined dynamic range of the cable modem.

12. A CMTS as recited in claim 10, wherein the cable modem's power level is incremented or decremented no more than the determined dynamic range of the cable modem.

13. A CMTS as recited in claim 10, the processor being further arranged to:

perform initial periodic ranging with a second cable modem to determine a second dynamic range of power levels of the second cable modem that are recognized by the CMTS, wherein the second dynamic range differs from the first dynamic range; and perform periodic ranging with the second cable modem to dynamically adjust the second cable modem's power level so that it substantially matches the desired power level, wherein the adjustments include incrementally increasing or decreasing the second cable modem's power level based on the determined second dynamic range of the second cable modem.

14. A CMTS as recited in claim 13, wherein the second cable modem's power level is incremented or decremented no more than the determined second dynamic range of the second cable modem.

15. A CMTS as recited in claim 10, the processor being further arranged to determine whether an adjustment flag associated with the cable modem indicates adjustment is to be performed, wherein the periodic ranging is only performed when it is determined that the adjustment flag associated with the cable modem indicates adjustment is to be performed.

16. A CMTS as recited in claim 15, the processor being further arranged to set the adjustment flag to indicate adjustment is to be performed when a user specifies the desired power level.

17. A CMTS as recited in claim 10, wherein the periodic ranging is performed on a plurality of cable modems associated with a same upstream channel, the periodic ranging comprising:

ranging the cable modems to a first set of incremental or decremental adjustments to their respective power levels;

tracking whether the cable modems have successfully ranged to the first set of incremental or decremental adjustments to the cable modems' power levels; and ranging the cable modems to a second set of incremental or decremental adjustments to the cable modems' power levels after the cable modems have all successfully ranged to the first adjustment to the cable modems' power level.

18. A CMTS as recited in claim 10, wherein the determined dynamic range represents a difference between a modem dynamic range of the actual power level output by the cable modem and a CMTS dynamic range for the CMTS recognizing the actual power level output by the cable modem.

19. A computer readable medium containing program instructions for dynamically adjusting a power level of a cable modem, the computer readable medium comprising:

computer readable code for performing initial periodic ranging with a cable modem to determine a dynamic range of power levels of the cable modem that are recognized by a cable termination system (CMTS); and computer readable code for performing periodic ranging with the cable modem to dynamically adjust the cable modem's power level so that it substantially matches a desired power level, wherein the adjustments include incrementally increasing or decreasing the cable modem's power level based on the determined dynamic range of the cable modem.

20. An apparatus for dynamically adjusting a power level of a cable modem, the apparatus comprising:

means for performing initial periodic ranging with a cable modem to determine a dynamic range of power levels of the cable modem that are recognized by a cable termination system (CMTS);

means for performing periodic ranging with the cable modem to dynamically adjust the cable modem's power level so that it substantially matches a desired power level, wherein the adjustments include incrementally increasing or decreasing the cable modem's power level based on the determined dynamic range of the cable modem.

21. An apparatus as recited in claim 20, further comprising means for receiving a new desired power level for the cable modem, wherein the periodic ranging is performed to dynamically adjust the cable modem's power level so that it substantially matches the new desired power level, wherein the adjustments include incrementally increasing or decreasing the cable modem's power level based on the determined dynamic range of the cable modem.

22. An apparatus as recited in claim 20, wherein the cable modem's power level is incremented or decremented no more than the determined dynamic range of the cable modem.

23. An apparatus as recited in claims 20, further comprising:

means for performing initial periodic ranging with a second cable modem to determine a second dynamic range of power levels of the second cable modem that are recognized by the CMTS, wherein the second dynamic range differs from the first dynamic range; and means for performing periodic ranging with the second cable modem to dynamically adjust the second cable modem's power level so that it substantially matches the desired power level, wherein the adjustments include incrementally increasing or decreasing the second cable modem's power level based on the determined second dynamic range of the second cable modem.

24. An apparatus as recited in claim 23, wherein the second cable modem's power level is incremented or decremented no more than the determined second dynamic range of the second cable modem.

25. An apparatus as recited in claim 20, further comprising means for determining whether an adjustment flag associated with the cable modem indicates adjustment is to be performed, wherein the periodic ranging is only performed when it is determined that the adjustment flag associated with the cable modem indicates adjustment is to be performed.

26. An apparatus as recited in claim 25, further comprising means for setting the adjustment flag to indicate adjustment is to be performed when a user specifies the desired power level.

27. An apparatus as recited in claim 20, wherein the periodic ranging is performed on a plurality of cable modems associated with a same upstream channel, the periodic ranging comprising:

means for ranging the cable modems to a first set of incremental or decremental adjustments to their respective power levels;

means for tracking whether the cable modems have successfully ranged to the first set of incremental or decremental adjustments to the cable modems' power levels; and means for ranging the cable modems to a second set of incremental or decremental adjustments to the cable modems' power levels after the cable modems have all successfully ranged to the first adjustment to the cable modems' power level.

28. An apparatus as recited in claim 20, wherein the determined dynamic range represents a difference between a modem dynamic range of the actual power level output by the cable modem and a CMTS dynamic range for the CMTS recognizing the actual power level output by the cable modem.

\* \* \* \* \*